United States Patent [19]

Conrad et al.

[11] Patent Number: 4,760,630
[45] Date of Patent: Aug. 2, 1988

[54] THERMAL DEBURRING SYSTEM

[75] Inventors: Hans-Jürgen Conrad, Rutesheim; Hanns Kurz, Stuttgart; Helmut Martini, Weil der Stadt; Gerhard Neumann, Kornwestheim, all of Fed. Rep. of Germany

[73] Assignee: Robert Bosch GmbH, Stuttgart, Fed. Rep. of Germany

[21] Appl. No.: 9,338

[22] PCT Filed: Mar. 6, 1986

[86] PCT No.: PCT/DE86/00087
§ 371 Date: Nov. 21, 1986
§ 102(e) Date: Nov. 21, 1986

[87] PCT Pub. No.: WO86/05730
PCT Pub. Date: Oct. 9, 1986

[30] Foreign Application Priority Data

Apr. 2, 1986 [DE] Fed. Rep. of Germany ....... 3512015

[51] Int. Cl.$^4$ ............ B21D 26/02; B24C 9/00; C21D 7/00
[52] U.S. Cl. .................. 29/33 A; 72/56; 51/426; 266/249
[58] Field of Search ............ 29/33 A, 421 E, 81 C, 29/90 A, DIG. 36; 266/249; 425/405, 430; 72/56; 51/426, 319; 148/9 R

[56] References Cited

U.S. PATENT DOCUMENTS

| 3,319,292 | 5/1967 | Witkin | 425/405 |
| 3,666,252 | 5/1972 | Rice | 266/249 |
| 3,677,674 | 7/1972 | Bowles | 425/430 X |
| 3,851,426 | 12/1974 | Lemelson | 51/319 |
| 3,901,488 | 8/1975 | Riddle | 266/249 X |
| 3,969,916 | 7/1976 | Wiberg | 72/56 |
| 4,001,977 | 1/1977 | Schrader | 51/426 |
| 4,085,883 | 4/1978 | Deribasehl | 72/56 X |

FOREIGN PATENT DOCUMENTS 988499 1/1983 U.S.S.R. ................... 425/405

Primary Examiner—William R. Briggs
Attorney, Agent, or Firm—Michael J. Striker

[57] ABSTRACT

An apparatus for the treatment of workpieces by means of temperature and pressure shocks through the ignition of a combustible gas mixture, particularly a thermal deburring system, is proposed whose workpiece treatment chamber (1, 21, 34) consists of an outer hollow member (3, 22, 35) and an inner hollow member (4, 29, 37) which are guided one into the other and are arranged so as to be movable relative to one another, the inner hollow member (4, 29, 37) having at least one combustion space (10, 31, 32, 39, 40) for receiving the workpieces, which combustion space (10, 31, 32, 39, 40) can be brought into the area of a wall (5, 23) of the outer hollow member closing the combustion space by means of a relative movement of the two hollow members.

7 Claims, 3 Drawing Sheets

4,760,630

THERMAL DEBURRING SYSTEM

BACKGROUND OF THE INVENTION

The invention is based on an apparatus for treating workpieces by means of temperature and pressure shocks through ignition of a combustible gas mixture, particularly for thermal deburring. Systems for thermal deburring are already known in various embodiments. These systems have a frame with supporting members which are arranged at defined distances from one another, one of these supporting members supporting the workpiece treatment chamber and the other supporting member supporting the closing system for the chamber, the closing cylinder being contained in the closing system. In practice, one distinguishes in principle between three types of frames for machines for thermal deburring. In the so-called "C-construction" the machine frame has the form of the letter "C". The flux of force is open. The treatment chamber is located between the open sides of the frame. In the "portal construction" the treatment chamber is fastened between two columns and tie rods at a transverse crosspiece which connects the columns with one another. Accordingly, a closed force flux occurs. Finally, there is also the so-called "plate construction". In the latter, the machine frame consists of two plates which are arranged at a defined distance from one another and are connected with one another by means of tie rods. The treatment chamber is fastened at the upper plate, while the lower plate supports the closing system for the chamber, which closing system comprises a closing cylinder with closing plate. It is common to all frame embodiments that the forces occurring during the compression and ignition of the gas mixture is transmitted via the treatment chamber and its closing system to the frame. The explosion pressure of the ignited gas mixture can reach values of up to 1000 bar. This pressure, which is very high for a short time, makes it necessary to dimension the parts of the machine frame so as to be correspondingly thick in order that the frame is not deformed when loaded. Accordingly, the system is expensive, heavy and bulky.

An apparatus for the treatment of workpieces by means of temperature and pressure shocks is known from DE-AS 17 52 440 whose treatment chamber can be closed so as to be pressure sealed by means of a threaded plate or a wedge sliding locking piece. The pressures occurring during the ignition of the gas mixture are absorbed by the treatment chamber and its closing piece so that a pressure-proof machine frame is dispensible. However, such a chamber is unsuitable for short clock times, since the loading of the chamber, its closing and opening, and the removal of the treated workpieces is extremely involved and time-consuming.

SUMMARY OF THE INVENTION

The apparatus according to the invention with the characterizing features of patent claim 1 combines the advantage that forces occurring during the compression and ignition of the gas mixture are absorbed by the workpiece treatment chamber with the advantage of a rapid, easy closing and opening of the chamber and introduction and removal of the workpieces. When the chamber walls are correspondingly dimensioned the indicated apparatus achieves loading capacity values similar to conventional systems in which the treatment chamber and its closing system are arranged in a pressure-proof frame. However, this is achieved with much lower costs in material, lower weight and space requirement because the frame, in which the treatment chamber is arranged, need only be designed, in accordance with the load, for the weight of the chamber and possible additional units. Accordingly, the entire system can be produced very inexpensively without having to sustain losses in terms of efficiency. It is emphasized in particular that a costly and disturbance-susceptible closing system with closing cylinder and closing plate for the combustion space of the chamber is dispensed with, since in order to close the combustion space a wall of the outer hollow member is used which can be brought before the combustion space opening by means of a relative movement of the two hollow members.

A particularly advisable embodiment form consists in that the outer hollow member is arranged so as to be stationary and the inner hollow member is arranged so as to be movable. With respect to production technology and construction it is also advantageous to construct the two hollow members as hollow cylinders. In so doing, a particularly compact construction can be achieved in that the hollow cylinder is guided in the outer hollow cylinder so as to be rotatable around its longitudinal axis and in that the outer hollow cylinder comprises a window, the combustion space opening, which is formed inside the hollow cylinder, can be placed opposite this combustion space opening. Another embodiment, in which the construction of a window in the outer hollow cylinder is omitted, consists in that the inner hollow cylinder is guided in the outer hollow cylinder so as to be displaceable in the direction of its longitudinal axis. In addition, the inner hollow cylinder can comprise a plurality of combustion spaces which are provided in each instance with an opening for inserting and removing the workpieces and which lie one behind the other in the movement direction of the member. By means of this arrangement it is possible to load a combustion space while the deburring process is taking place in another combustion space. This results in a shortening of the clock time.

BRIEF DESCRIPTION OF THE DRAWING

Embodiment examples of the invention are shown in the drawing and are explained in more detail in the following description.

DESCRIPTION OF THE PREFERRED EMBODIMENTS

Figure 1:
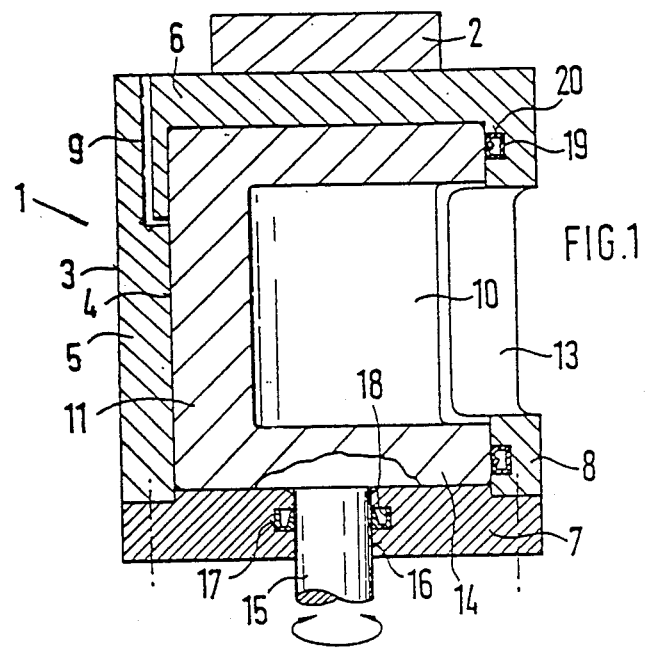
FIG. 1 shows a longitudinal section through a treatment chamber for thermal deburring in a first embodiment form, shown schematically.

The treatment chamber 1 shown in FIG. 1 for thermal deburring is fastened at a crosspiece 2 of a machine frame, not shown further. In particular, the treatment chamber 1 consists of an outer hollow cylinder 3 and an inner hollow cylinder 4. The hollow cylinder 3 has an annular wall 5, a head part 6, which is formed in one piece with the latter, a separate base part 7, which is welded on at the lower end face of the annular wall 5, and an annular segment ledge 8 which is connected with the base part. A feed borehole 9 for combustible gas is constructed in the head part 6 and in the annular wall 5.

The inner hollow cylinder 4 is rotatably supported in the stationary hollow cylinder 3. It comprises a combustion space 10 for receiving workpieces to be deburred, which combustion space 10 opens toward the annular wall 5 of the outer hollow cylinder 3. The opening of the combustion space can be placed opposite a window 13 formed in the annular wall 5 of the outer hollow cylinder 3 for the introduction and removal of the workpieces. A shaft 15, which penetrates a borehole 16 constructed in the base part 7 of the outer hollow cylinder 3, is fastened at a base part 14 of the inner hollow cylinder 4. A step motor, not shown, which rotates the inner hollow cylinder 180 degrees per step, acts at the shaft 15, wherein a stepping movement with constant as well as alternating rotating direction is possible.

A seal 18 is arranged in a groove 17 between the shaft 15 and the borehole 16. Another seal 19 lies in a groove 20 surrounding the window 13, which groove 20 is constructed at the inside of the annular wall 5 of the outer hollow cylinder 3. This seal is an inflating tube of elastic, heat resistant material which is fillable with a pressure medium, e.g. water.

Figure 2:
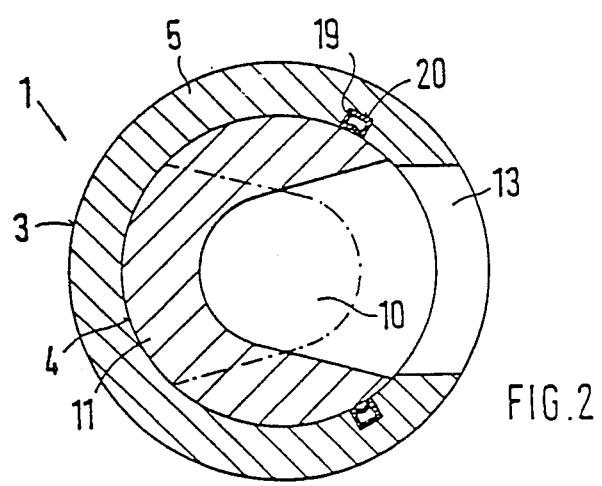
FIG. 2 shows the treatment chamber, according to FIG. 1, in a cross section.

In order to insert the workpieces, which are to be treated, in the combustion space 10 the inner hollow cylinder 4 is brought by means of the step motor into the position, shown in FIGS. 1 and 2, in which the combustion space opening is opposite the window 13 of the outer hollow cylinder 3. After loading, the inner hollow cylinder 4 is rotated 180 degrees so that the combustion space 10 occupies the position, shown in dot-dash lines in FIG. 2, in which it is closed by means of the annular wall 5 of the outer hollow cylinder 3. Before admitting the gas mixture into the combustion space 10 and igniting same, the inflating tube 19 is "pumped up" by means of admitting the pressure medium. In so doing it lies firmly against the outer surface area of the annular wall 11 and prevents hot explosion gases from exiting from the window 13 of the outer hollow cylinder 3 during the explosion of the gas mixture in the combustion space 10. Before the hollow cylinder 4 moves back into its initial position the inflating tube is emptied so that its cross section is reduced. Accordingly, the friction locking engagement between the seal and the outer surface area of the hollow cylinder 4 is reduced and, consequently, so is the wear occurring at the seal. The use of water as pressure medium furnishes the advantage that the seal is cooled from the inside and the thermal loading of the sealing material is reduced.

Figure 3:
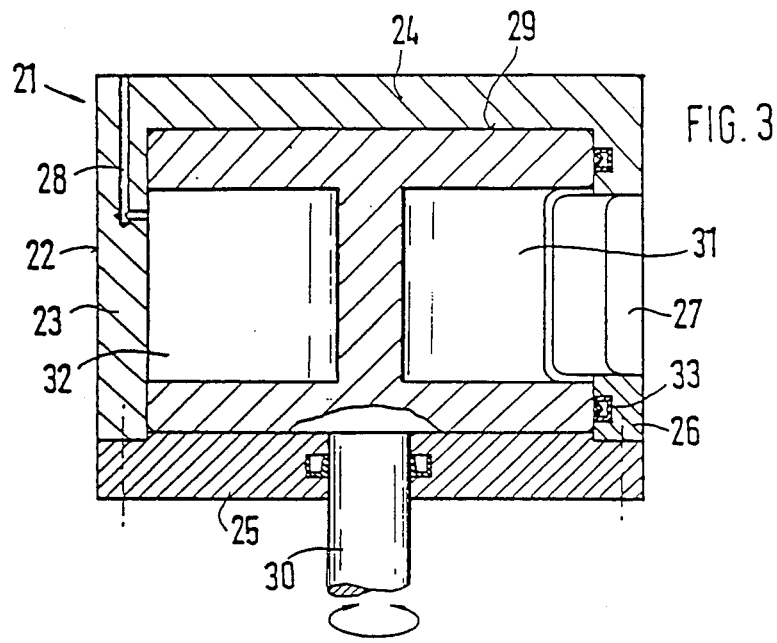
FIG. 3 shows a treatment chamber with a plurality of combustion spaces in longitudinal section and constructed according to the principle of the arrangement according to FIG. 1.
Figure 4:
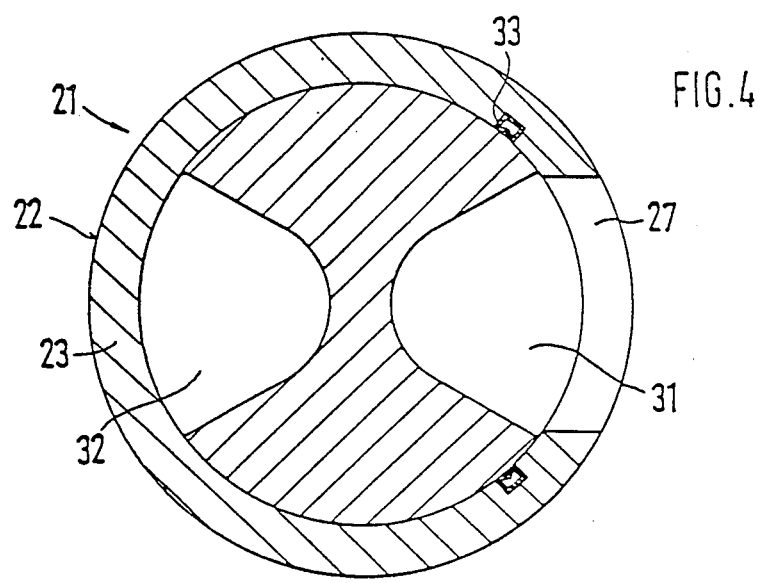
FIG. 4 shows the chamber, according to FIG. 3, in cross section.

In the type of construction shown in FIGS. 3 and 4, the workpiece treatment chamber 21 likewise consists of a stationary outer hollow cylinder 22 with annular wall 23, head part 24, base part 25, annular segment ledge 26, window 27 and gas feed borehole 28, as well as a rotatable inner hollow cylinder 29 with drive shaft 30. In a departure from the embodiment form according to FIGS. 1 and 2, the cylinder 29 has two hollow spaces 31 and 32 serving as combustion spaces which are arranged so as to be offset relative to one another by 180 degrees. This construction makes it possible to insert workpieces to be deburred into a combustion space through the window 27 of the outer hollow cylinder 22 while the other combustion space is found in its work position for implementing a deburring process. An inflating tube seal 33 surrounding the window 27 also ensures that the hot explosion gases are kept away from the window 27.

Figure 5:
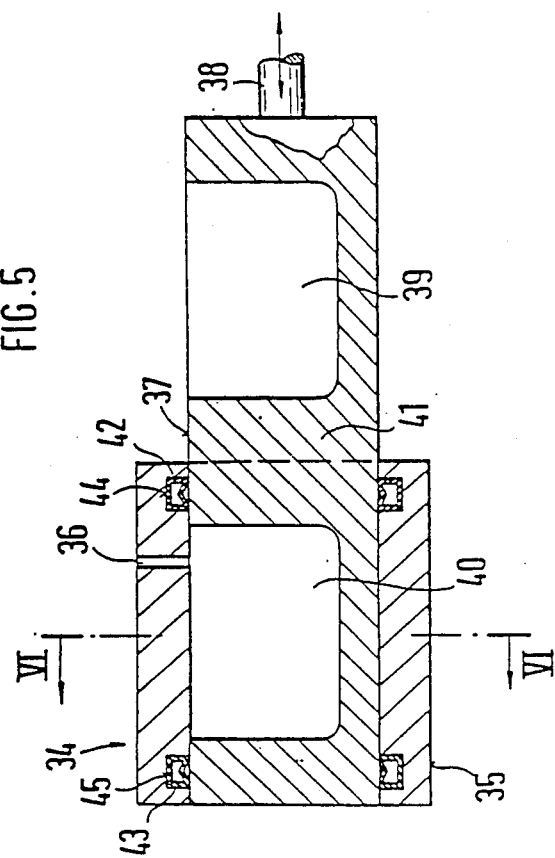
FIG. 5 shows another embodiment form of a treatment chamber with a plurality of combustion spaces, in longitudinal section.
Figure 6:
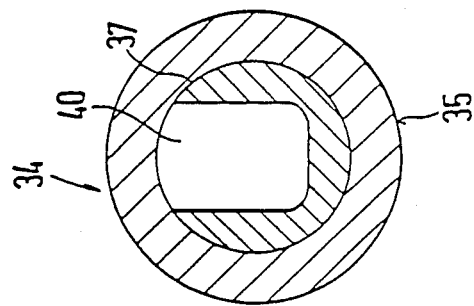
FIG. 6 shows the chamber according to FIG. 5 in a cross section along line VI—VI of FIG. 5.

In the embodiment example according to FIGS. 5 and 6 the workpiece treatment chamber 34 consists of an outer, stationary hollow cylinder 35 which is open at its front side and comprises gas feed borehole 36 and an inner hollow cylinder 37 which is guided in the outer hollow cylinder 35 by means of a hydraulic ram 38, which is fastened at one of its front sides, so as to be displaceable in the direction of its longitudinal axis. Two combustion spaces 39 and 40 are incorporated in the cylinder 37 and serve to receive the workpieces to be deburred. the combustion spaces are separated from one another by means of a center web 41 and are loaded from above. The drawer principle employed makes it possible to load the respective empty combustion space with workpieces to be treated while a treatment process takes place in the other combustion space which is located in the outer hollow cylinder 35. In order to seal the respective combustion space located in the work position, particularly to prevent hot gases from exiting after the ignition of the gas mixture, two closed sealing rings 42, 43 are provided which fit in circulating grooves 44, 45 which are constructed at the inner surface area of the outer hollow cylinder 35. The seals rest against the outer surface areas of the walls of the inner hollow cylinder 37, which walls define the combustion spaces. As in the construction types according to FIGS. 1 to 4, inflating tubes can be used as sealing rings and are "pumped up" before the introduction of the combustible gas mixture into the combustion space located in the work position and the ignition of same and are emptied again after the treatment process is concluded, before a movement of the slider 37 takes place. In order to fill the tubes a fluid medium, e.g. water, can be used which is admitted into the tubes with positive pressure.

Hollow members of other shapes, for example, with rectangular or square cross sections, can also be used, at least in the construction type according to FIGS. 5 and 6, in place of hollow cylinders.

We claim:

1. An apparatus for treating workpieces by temperature and pressure shocks from ignition of a combustible gas mixture, particularly for thermal deburring, the apparatus comprising:

a closable treatment chamber having an inner hollow member and an outer hollow member, said outer hollow member having a wall, said inner hollow member forming at least one combustion space and having an opening communicating with said combustion space, said members being movable relative to each other between a first position, in which said opening is accessible and the workpieces are insertable through said opening to said combustion space, and a second position, in which said opening faces and is closed by said wall of said outer hollow member; and means for sealably closing said combustion space and including seals (19, 33, 42, 43) arranged between said inner hollow member (4, 29, 37) and said outer hollow member (3, 22, 53) and formed as inflatable tubes, each of said tubes being fillable with one of a fluid and a gaseous pressure medium prior to an implementation of a deburring process.

2. Apparatus according to claim 1, characterized in that said outer hollow member (3, 22, 35) is arranged stationary and said inner hollow member (4, 29, 37) is movable.

3. Apparatus according to claim 1, characterized in that said two hollow members are constructed as hollow cylinders.

4. Apparatus according to claim 1, characterized in that said inner hollow member (4, 29) has a longitudinal axis and is guided in said outer hollow member (3, 22) so as to be rotatable around said longitudinal axis and in that said outer hollow member has a window (13, 27), said opening in said inner hollow member being positionable opposite said window (13, 27).

5. Apparatus according to claim 1, characterized in that said inner hollow member has a longitudinal axis and (37) is guided in said outer hollow member (35) so as to be displaceable in a direction along said longitudinal axis.

6. Apparatus according to claim 1 characterized in that said inner hollow member (29, 37) is movable in a direction of movement and has a plurality of combustion spaces (31, 32, 39, 40) each being provided with an opening communicating therewith for inserting and removing the workpieces to be treated, each of said openings lying one behind the other in said direction of movement of said member.

7. Apparatus according to claim 2, characterized in that said two hollow members are constructed as hollow cylinders.

* * * * *